United States Patent Office 2,783,891
Patented Mar. 5, 1957

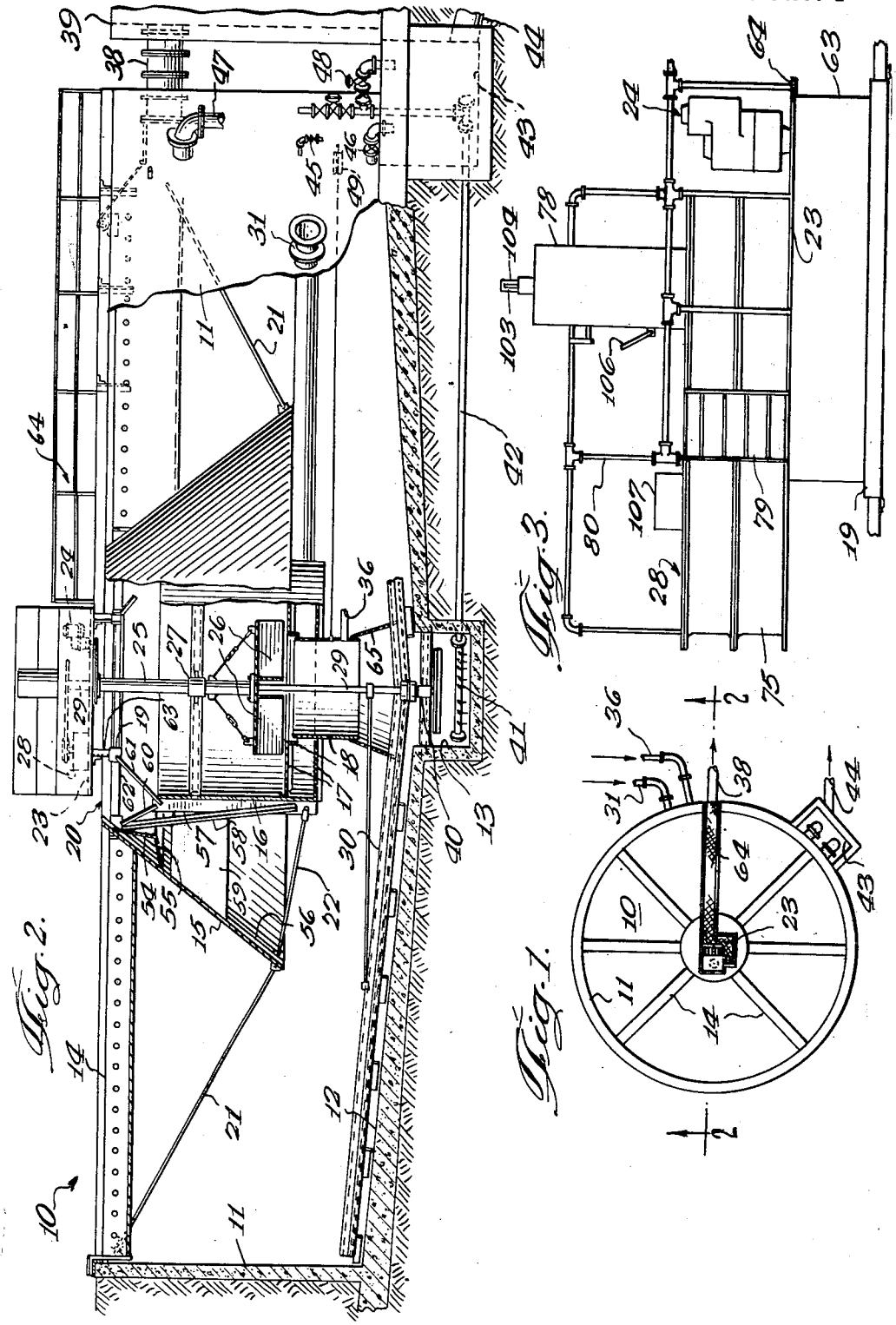

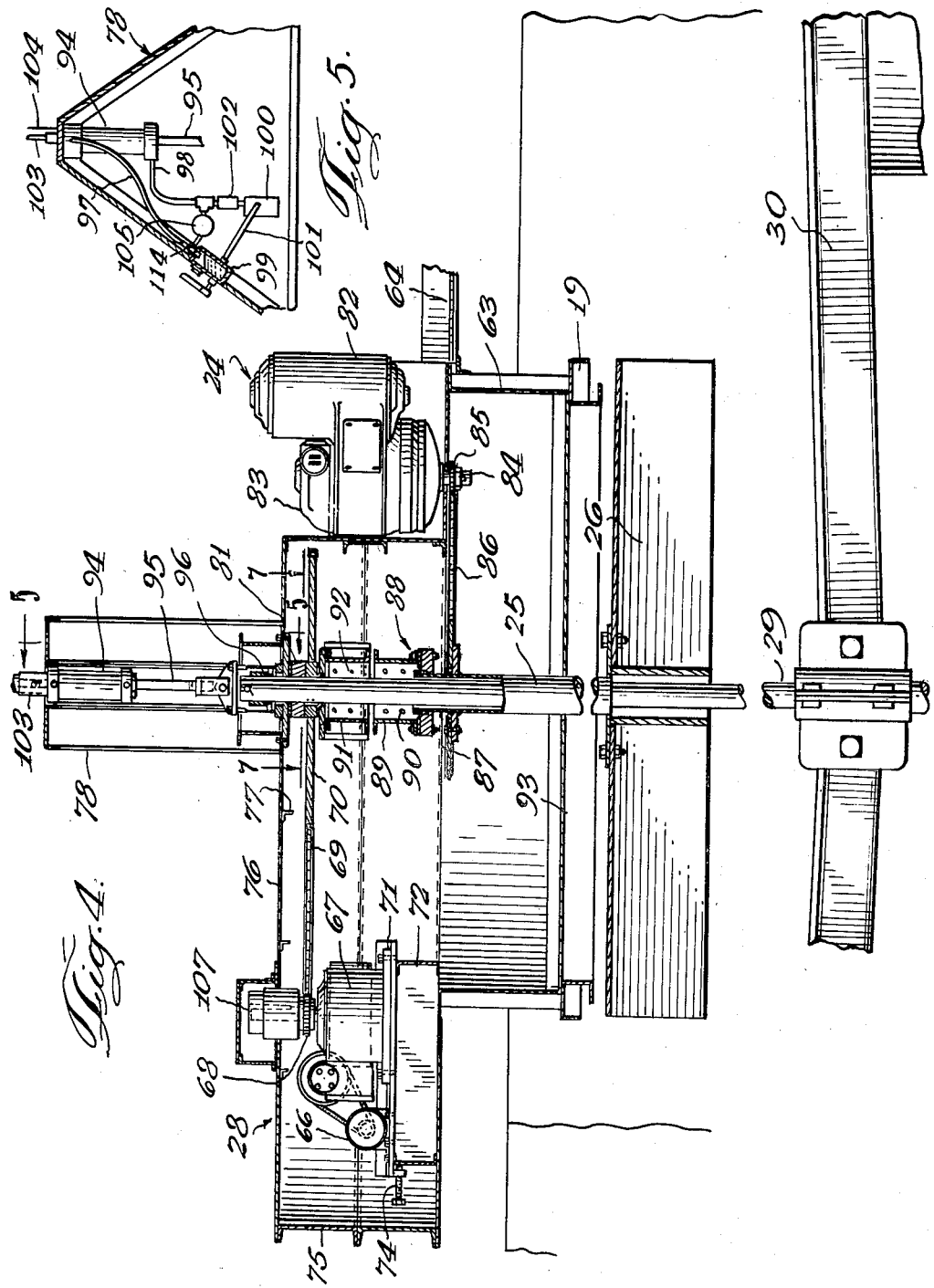

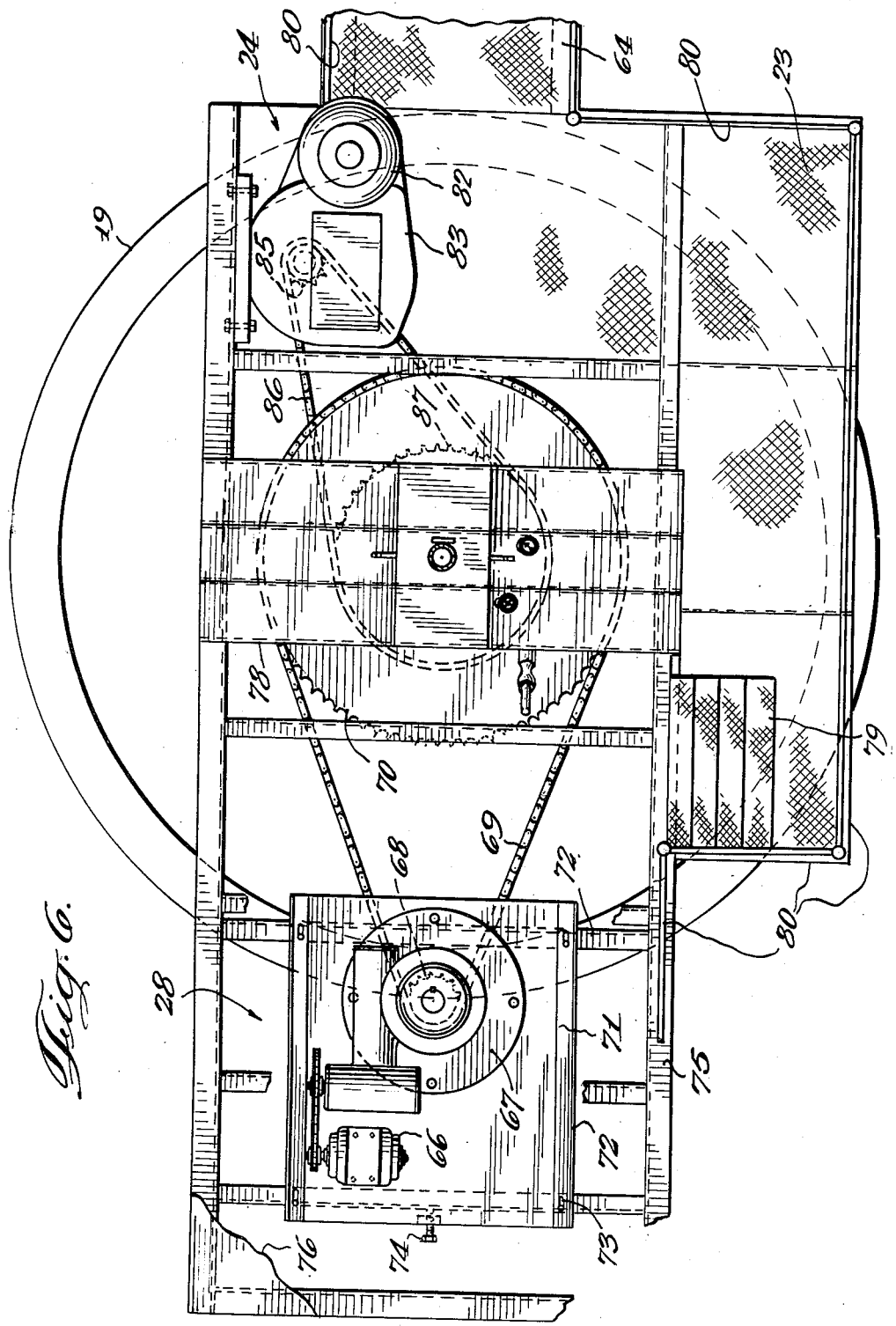

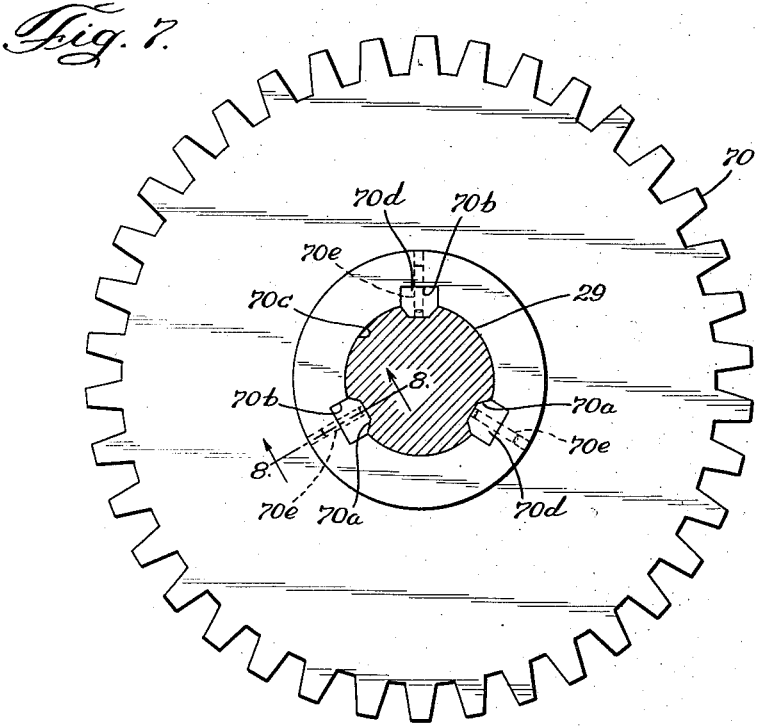
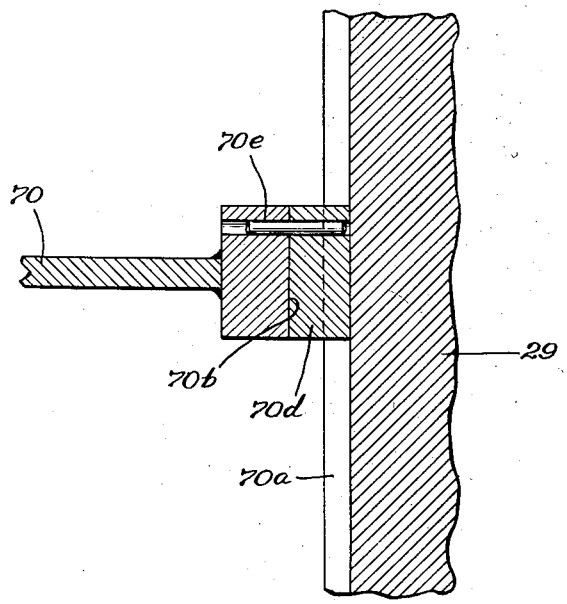

2,783,891

SLUDGE SCRAPER OVERLOAD CONTROL FOR SLURRY CLARIFIERS

Robert H. Kunz, Elgin, Ill., and Alfonse J. Soriente, New York, N. Y.

Application August 26, 1954, Serial No. 452,362

4 Claims. (Cl. 210—55)

This invention relates to sludge scraper overload control means for slurry clarifiers.

In ordinary clarifiers it is usual to provide sludge scraper overload indicator and alarm devices interposed on the drive mechanism for the scraper shaft as shown for instance by J. V. N. Dorr, Patent 1,106,865. Such devices may operate electrical, hydraulic or other power means, in various obvious manners known to the art. It is also known that, in order to gradually overcome an overload, the overload-correcting power means may raise either individual scraper blades or arms, as shown for instance by W. E. Andrew Patent 189,541, or the entire scraper assembly, as shown for instance by H. Kepper, Patent 2,122,287 or H. Hardinge Patent 2,226,974.

The present invention is an improvement on the Kepper-Hardinge type of apparatus. Heretofore, such apparatus was usable only in plain settler-clarifiers. By means of special developments, not very pertinent here, such apparatus was made available for use in large, plain settler-clarifiers with central support piers.

The present invention contributes to the art an apparatus design whereby a device of this general type becomes usable in a slurry type clarifier with sludge scrapers, thereby simultaneously improving the operation of such a clarifier.

Slurry type clarifiers are basically known for instance from British Patent No. 5,332/1905 of Declercq and U. S. patents of Spaulding 2,127,314 and Hughes 2,245,588. As shown in those patents, slurry clarifiers were generally built and used without sludge scrapers; settling sludge being either prevented (Spaulding, Hughes) or collected by gravitational flows over steep bottom walls (Declercq). The Declercq system is available only in very small tanks because otherwise, the depth of the tank becomes prohibitive. The Spaulding-Hughes system is satisfactory only in tanks up to a limited diameter and area because otherwise, the sludge-collecting flows create difficulties in the slurry suspension. Therefore, slurry clarifiers with sludge scrapers added to the slurry circulators have been introduced, as shown for instance by F. D. Prager Patent 2,400,598 and J. Galandak, application No. 447,078, filed August 2, 1954 copending herewith.

Considerable difficulties were originally encountered in the introduction of combined slurry circulators and sludge scrapers, mainly in large tanks requiring still further central supports, partitions, etc. Attempts were therefore made to simplify the drive arrangements by the use of traction type scraper drives and/or air lift type slurry circulators, as shown for instance by the patent of E. Kamp 2,427,092, or by very special partition and duct designs as in L. W. Bicker et al. 2,419,004. However, drawbacks of various kinds, now known to the art, were inherent in such designs.

Therefore, it has occurred to us that a return to and modification of the Kepper-Hardinge plain settler overload control may be desirable for slurry clarifiers of the Prager-Galandak type. That is, we developed a mechanical slurry impeller and sludge scraper shaft, drive and control design, capable of bodily raising and lowering movements for the sludge scraper (as in Kepper-Hardinge) while normally continuing the slow rotation of the scraper (as in Prager-Galandak) and also normally continuing a rapid rotation of the impeller (as in Declercq, etc.); a particular feature being provided in that the slowly revolving scraper shaft rises in and through the rapidly revolving impeller shaft. In order to make this combination of features available, a novel center top structure was developed for the slurry clarifier.

It was further discovered that greatly improved operation and treatment result from the further feature that the new mechanism allows continuation of the slow scraper rotation at a variety of levels, while continuing the rapid impeller rotation at one and the same level.

The details and advantages of these and other features will become more apparent upon a study of the description of a preferred embodiment, which follows.

Figure 1 is a plan view of a clarifier equipped with a mechanism in accordance herewith.

Figure 2 is a sectional view of a similar clarifier on a larger scale, the view being taken in a plane such as that of lines 2—2 in Figure 1.

Figure 3 is an elevation drawn on a more enlarged scale and showing the general sub-assembly of the central control mechanism.

Figure 4 is a sectional view taken in a plane such as that of lines 2—2 in Figure 1 and showing the mechanism of Figure 3 with further enlargement.

Figure 5 is a fragmentary sectional view taken along lines 5—5 in Figure 4.

Figure 6 is a plan view, on a still larger scale but still much reduced from actual dimensions, showing the mechanism of Figures 3 and 4, with parts thereof broken away.

Figure 7 is a fragmentary sectional view taken along line 7—7 of Figure 4; and

Figure 8 is a fragmentary cross-sectional view taken along line 8—8 of Figure 7.

Referring first for general orientation to Figures 1 and 2: The clarifier 10 comprises a tank formed by a side wall 11 upstanding from a bottom 12. It has a central bottom sludge sump 13 for the removal of sludge and a system of top overflow launders 14 for the removal of clarified water. An internal recirculation of slurry within the tank is guided by a hollow, truncated cone partition 15 and a hollow cylinder partition 16 co-axially installed therein. The bottom of the cylinder 16 has a raw water inlet ring 17 surrounding a slurry recirculation inlet tube 18. These members 17, 18 may also serve to reinforce the bottom of the cylinder 16 whereas the top of the cylinder has a structural reinforcement ring 19 secured thereto by a spider 20. Support for the partitions 15, 16 is provided by a system of tension rods 21, 22 extending from the outer ends of the launders 14 to the bottom of the cone 15 and from there to the bottom of the cylinder 16.

Referring now to Figures 1 to 3: The power and control equipment, forming the object of the present invention, is installed upon a platform 23. It comprises a recirculator drive unit 24, which has a hollow, vertical, downwardly depending output shaft 25 to rotate a centrifugal or turbine type impeller 26 and thereby to circulate slurry upwards through the tube 18 and cylinder 16 and downwards back through the cone 15. The impeller shaft 25 is held in a suitable guide bearing 27 below the platform 23.

Said platform also supports a sludge scraper drive unit 28 to actuate an innermost, vertical shaft 29 which extends through the hollow impeller shaft 25 and in turn supports, closely above the bottom 12, a sludge scraper truss 30. The invention is largely connected with control means to cause certain relative motions between the concentric shafts 25 and 29; such means being installed upon the platform 23.

Before the details of such control means are described it may be well to identify the other principal operating parts of the clarifier, which may be conventional. They comprise a raw water inlet 31 communicating with the inlet ring 17; a chemical inlet 36 communicating with the slurry inlet tube 18; and a clarified water outlet 38 which may lead for instance from the launders 14 to a clear well 39. There may be a bottom guide bearing 40 for the scraper shaft 29; a sludge pick-up 41 in the central sump 13; and a sludge pipe 42 from the central sump to a peripheral sludge well 43, drained by a sewer 44. A skimmer 45, tank drain 46, and overflow 47 may also discharge into the well 43. The sludge pipe 42 may be controlled by valves 48. Samplers 49 may also be provided.

The embodiment shown also comprises a clear water collector interposed between launders 14 and outlet 38 and formed by wall structures 54, 55 in the upper part of the cone 15.

Reinforcements 56, 57, 58, 59 may be used to brace the cone 15 and cylinder 16. The spider 20 supporting the platform 23 may consist of structural members 60, 61, 62, forming systems of triangular support, held by the cone 15 and cylinder 16 and holding the ring 19. A structure 63, preferably in the nature of a closed, cylindrical housing, rises from the ring 19 and has the platform 23 secured to its top. Thus a firm foundation is formed, above the bottom 12, for the power and control equipment. By means of a conventional bridge 64 access is provided to said equipment from the side wall 11 of the tank.

Referring now to the scraper rotating drive unit 28, best shown in Figures 4 and 6:

This unit comprises a motor 66, typically rated at about a half horsepower when driving a scraper truss 30 of 50 to 100 feet diameter. The traveling speed of such a scraper truss must be kept very slow. It must not be more than a few inches or fractional inches per second at the outer tip of the truss. Such slowness is desirable for functional as well as mechanical reasons. Functionally, it avoids destructive boil-ups of slurry and aids in beneficial thickening of sludge. Mechanically, the slow speed of the scrapers minimizes the impact of any sudden overload.

In order to provide this slow scraper speed it is necessary to reduce the conventional rotational speed of the motor 66, which may be about 1800 revolutions per minute. For this purpose a speed reducer 67 is coupled to the motor 66. The speed reducer desirably has a vertical, upwardly projecting output shaft, with a small sprocket 68 secured thereto. A last stage of speed reduction is provided by a chain 69, connecting the sprocket 68 with a large sprocket 70 which is fast on the scraper shaft 29 above the hollow impeller shaft 25. In order to insure the proper degree of tension or slack in the chain 69, the motor 66, speed reducer 67 and small sprocket 68 may be mounted as a unit on a base 71 slidable toward and away from the large sprocket 70. For this purpose a suitable subbase or frame 72 secured to the platform 23 may have a guiding slot and pin device 73, interconnecting the base 71 with the frame 72. Tension may be maintained against the pull of the chain 69 by a set screw 74.

The scraper power unit 28 is mounted remotely from the center shaft 29 to facilitate maintenance operations both on the power unit and on the shaft. However a housing 75 desirably surrounds and encases the scraper power unit 28 to protect it from the weather; and the top 76 of this housing, supported by suitable rafters 77, may also serve to provide access to the scraper lifting mechanism 78. As best shown in Figure 3, the height of the housing 75 above the platform 23 may amount to several feet because of the space required for the platform arrangement 71, 72, the motor reducer 66, 67 and the sprocket 68. Appreciable space is also required for the scraper lifter mechanism 78; and access to that mechanism is here provided by steps 79 leading from the basic platform 23 to the roof 76. The platform and roof may be guarded in conventional manner by hand rails 80. The lifter mechanism 78 is installed upon and above the roof 76 of the drive motor housing 75.

The roof 76 also provides a convenient location for a bearing 81, interconnecting the scraper shaft 29 with the mechanism of the scraper lifter 78 with the exact alignment required for such parts.

Referring now to the impeller drive unit 24:

This unit comprises a powerful motor 82, typically providing for instance 12 to 15 horsepower in a clarifier of about 100 feet diameter. Such an impeller drive can maintain a slurry recirculation of about 20 or more cubic feet per second, at velocities such as 1 to 3 feet per second, through the cone and cylinder partitions 15, 16. The speed reduction required between the motor 82 and impeller 26 is less pronounced than that of the scraper drive unit 67. It is desirably obtained in an adjustable speed reducer 83. This reducer has a vertical output shaft 84 which projects downwards through the platform 23 and carries a small sprocket 85 below the same. A chain 86 provides the last stage of speed reduction to a large sprocket 87 which is fast on the top of the hollow impeller shaft 25. Typically, the hollow shaft 25 may make 3 to 10 revolutions per minute, depending upon the adjustment of the speed reducer 83, whereas the central scraper shaft 29 may make only about 1 revolution per hour.

The housing 75 provides support for a top bearing 88 of the rapid impeller shaft 25, with accurate alignment relative to the inner, slow shaft 29. To this end, bearing support girders 89 extend transversely through the housing 75, being secured thereto by bolts 90. Similarly the bearing 81 of the scraper shaft may be held by bearing support girders 91 extending across the housing 75 and secured thereto at 92. Access to the bearings 81 and 88 can be provided on the inside of the housing 75. That is, the central part of this housing can be made relatively deep; for instance by placing the bottom 93 of this housing at the lower end of the support structure 63, which may be at least 4 to 5 feet below the roof 76.

Referring now to the scraper overload control and lifting mechanism, best shown in Figures 4 and 5:

A particular kind of overload is typically encountered in clarifiers of the present type, calling for variable degrees of scraper lift. This kind of overload is largely connected with the slurry treatment. It differs in several respects from the typical overloads encountered in sewage clarifiers and the like.

The principal source of said overload, in the present case, consists in the large amount of sludge, likely to settle on the tank bottom 12 upon any shutting down of the slurry impelling and recirculating operation; for instance in case of nightly or weekly interruptions of the treatment. Even without a complete shutdown the slurry treatment may lead to variable accumulations of sludge, because of changing chemical conditions and the like. Further, the sludge so accumulating on the bottom is often very heavy and hard to move. This applies mainly in the case of water softening, which is one of the important applications of this kind of clarifier. The scraper truss 30 tends to be "snowed under" from time to time.

In such cases it is theoretically possible to overcome the resulting excess loads by providing proportionally enlarged power in the scraper drive unit. However, this would enormously add to the cost of the installation. Likewise it is quite prohibitive simply to remove the sludge by manual power of auxiliary equipment, as often practiced in sewage tanks and the like. The sludge and slurry, in the present case, are treatment agents, not only waste material. In fact it is particularly important after a shutdown to move sludge in a controllable manner, in order to restart the slurry process as rapidly as possible. Even in that case restarting of the process may require a number of minutes or hours.

Therefore the mechanism 78 is adapted bodily to lift the slowly rotating scraper truss 30 and scraper shaft 29, to a controllable extent, through the rapidly rotating, vertically stationary hollow impeller shaft 25.

The impeller shaft must not be raised or lowered with the scraper shaft; it must even be protected from minor changes. The reason is that a delicate hydraulic adjustment must be maintained between the impeller 26 and the water and slurry inlet structures 17, 18. Raising or lowering of the impeller 26 by as little as a half inch would seriously affect if not destroy the effect of the recirculation system.

On the other hand the slow scraper shaft and the truss thereon may require lifting by up to 12 inches, depending upon the depth of the sludge settled on the bottom of the tank.

In order to provide a controllable vertical scraper shaft stroke of up to 12 inches height, not affecting the other equipment, the mechanism 78 comprises a vertical, hydraulic, stationary cylinder 94 containing a conventional piston, not shown. The piston is connected with the top of the scraper shaft 29 by linkage 95, preferably being arranged in line with said shaft. This linkage 95 is shown as restrained from rotation and is therefore connected with the slowly rotating shaft 29 by a bearing 96. Further, arrangement is made not to lift the sprocket 70 with the shaft 29. For this purpose the sprocket 70 is connected with its shaft by a key slidable in a long slot. Also, the sprocket 70 is interposed between upper and lower parts of the bearing 81; and these parts are arranged to resist upward as well as downward thrust of the shaft 29. Figures 7 and 8 illustrate a preferred slidable connection between the sprocket 70 and the shaft 29. For example, the shaft 29 may be provided with one or more axially elongated truncated slots 70a, while the sprocket 70 may be provided with complementally arranged slots 70b in the periphery of the central aperture 70c which receives the shaft 29. Where more than one pair of such slots are employed they may be arranged at equal angular spacing. Key members 70d are fixedly secured in slots 70b as, for example, by the pin connection 70e. This arrangement accommodates the desired axial movement of the shaft 29 through the aperture 70c while the sprocket 70 is maintained in a fixed vertical position. The impeller sprocket 87 can be fast on its hollow shaft 25.

The hydraulic piston with the slowly rotating scraper mechanism thereon is raised, lowered or locked in position, as may be required, by a hydraulic pump and valve system interposed on top and bottom tubes 97, 98 for the cylinder 94. A substantially closed system of oil or other hydraulic fluid is provided by a small oil tank 99 in the hydraulic lifter housing 78. A pump 100 is adapted by an inlet tube 101 to pump oil from the tank 99 through a check valve 102 to the bottom tube 98 of the cylinder 94. Such operation raises the piston and the scraper shaft and truss; the displaced oil from the top of the cylinder being simultaneously discharged through the tube 97 into the tank 99.

When the piston and scraper have been raised to a sufficient extent—desirably indicated by a gauge or tail rod 103 upwardly projecting from the mechanism 78 in front of a scale 104—the operation of the pump 100 can be stopped. The weight of the mechanism tends to lower the piston but such lowering is prevented by the check valve 102; thus the scraper mechanism is locked against vertical displacement, while it continues to rotate slowly.

Lowering of the piston and scraper can be allowed, under the operator's control, by opening a path for flow of oil through a bypass 114. This bypass is connected to the tube 98, between the check valve 102 and the bottom of the cylinder 94, and leads to the oil tank 99. A combined closure and throttle, such as a needle valve 105, is desirably interposed on this bypass, which can either be closed completely or set to a predetermined opening, thereby allowing gradual, safe, gravitational descent of the scraper.

The pump 100 may be operated manually by a handle 106 shown in Figure 3 or automatically by a separate small motor. Operation of the pump may be initiated either by an alarm 107 connected with the scraper power unit 28 or by an overload switch similarly connected. The various possibilities in such respects will be obvious to persons skilled in the art, so that they need not be described in detail.

Referring now briefly to the operation of the new apparatus, particularly in the event that the clarifier 10 is used as a water softener:

The tank 10 is normally full of water under treatment, up to the overflow weirs or orifices of the collector launders 14. Hard water is introduced at 31 and softening reagents at 36. The impeller drive 24 continuously rotates the circulator impeller 26 at a top velocity which may for instance be normally kept at 2 feet per second by the adjustable speed reducer 83.

After initial or starting operations which need not be described herein fairly large particles of precipitated hardness are present in the water circulated by the impeller 26 and such particles are further built up in size, weight and resistance to breakdown by the impeller, by repeated recirculations through the partition system 13, 16, 15. A certain balance is gradually established as to concentration and characteristics of precipitated hardness particles or flocs in the circulating mixture and the mixture may then be considered as a normal slurry.

As additional raw water enters the tank such normal slurry is gradually outwardly displaced from the open bottom of the cone 15 into the surrounding upflow zone of the tank 10. Even in the bottom of this upflow zone some little particle suspending energy is applied, by the outward spreading of the agitating effects of the downward and inward part of the slurry circulation, from the bottom of cone 15 to the bottom of cylinder 18. In addition, some little floc suspending energy is supplied by the upward flow of the water under treatment towards the launders 14, although this latter effect is desirably kept relatively minor, particularly in the upper parts of the tank; an objective which is well served by the cone shape of the partition 15. Thus it has been found possible in practice to maintain a so-called slurry bed suspended in and limited to the lower part of the tank 10, safely below the launders 14. With proper adjustment of slurry circulating velocities, chemical application and other factors known to the art this process is quite successful even in tanks of large diameter such as 50 to 100 feet. It has also been found possible to treat very large quantities of water in such tanks, for instance to soften continuous flows such as 10,000 to 20,000 gallons per minute in a tank of 100 foot diameter.

Raw water flows of such magnitude are frequently brought together from a variety of sources, or from a single source subject to variation in characteristics. As a result the exact formulation of the softening chemicals required at 36 varies correspondingly; and it is frequently unavoidable that somewhat sudden changes in raw water characteristics are compensated only after some little time lag, by corresponding modifications of chemical feed. Such temporary abnormality in turn may have a variety of effects upon the vital sludge bed or sludge blanket. It is not believed to be necessary at this point to describe all of the various effects of chemical change upon the slurry treatment but we do believe the effect upon sludge sedimentation should be clearly in mind.

Some sedimentation of sludge is always in effect, in the operation of a clarifier of the present type; it has even been found difficult or impossible in clarifiers of the Spaulding and Hughes types to avoid such effects.

In the present clarifier it is a further normal feature of operation that the sludge scraper truss 30 is motivated continuously by its drive unit 28 to perform its uniform slow rotation, which normally has no mechanical or hydraulic effect upon the slurry blanket but which is necessary in order to keep the depth of the treatment zone available, to prevent accumulation of septic materials, to dispose of excess hardness precipitates in proper manner, and for other purposes. However, the rate of sludge accumulation on the bottom 12 is subject to wide changes, not only in response to the normally varying amounts of raw water entering at 31 but also in response to water and chemical conditions as mentioned, water temperatures and other factors. It is normally possible so to adjust the chemical feed as to prevent any appreciable thinning out of the sludge blanket and reduction of sludge sedimentation therefrom, by chemical selection and control routines known to the art. It is unavoidable however that increased rates of sedimentation are occasionally encountered for the reasons stated. As a result there is a tendency to form, below the practically immovable water level at the top of the launders 14, a slurry blanket the depth of which may vary for instance between about 5 and 6 feet above the bottom 12, and a lowermost layer of settled sludge upon the bottom 12, the depth of which may vary between fractional inches and several integral inches.

In the interest of simplicity of the mechanical impeller and scraper installation it would be most desirable to compensate for such variations of the settled sludge layer by simply varying the rotating velocity of the scraper truss 30. This however has been found prohibitive, because of resulting disturbance of the hydraulic balance required for the slurry blanket.

It is for this reason, which is rather peculiar to slurry clarifiers with sludge scrapers, that we have found it necessary to install in addition to the basic rotary equipment, lifting equipment for the slow scraper mechanism, capable of lifting the same bodily. Lifting equipment of a generally somewhat similar type as mentioned has been installed in plain settlers, for entirely different reasons. Also, in plain settlers the degree of bodily lift applied to the scraper system was frequently much greater than in the present case. In the slurry clarifier 10 of course the scraper truss 30 can be lifted only to such extent as is allowed by the clearance between the top of this truss and the bottom of the stationary slurry circulating partition structure 18, 16, 15. Inasmuch as this structure desirably picks up slurry for recirculation at a rather low point in the center of the tank it is most desirable herein to limit the bodily lifting of the scraper to a minor fraction of the depth of the tank, such as 12 inches; and lifting to such extent has been found sufficient in connection with the slurry and sludge bed considerations stated above.

The existence of conditions calling for a lifting of the scraper truss may be noted either by proper sampling at 49 or, as a kind of emergency procedure, by the alarm or switching mechanism 107. This latter mechanism can be so selected and adjusted as to react if and when the scraper truss 30 has been "snowed under" in the settled sludge to a predetermined extent. Thereupon the scraper system can and should be raised, for instance by suitable manual operation of the pump handle 106 accessible from the top of the roof 76, until it is clear that the scraper operates at or near an upper part of the sludge bed indicated by the samplers 49 or alarm device 107 or both.

Operation of the scrapers at such elevated level can then be continued without fear or danger of mechanical overload and resulting breakdown of the treatment process. When continued over a sufficient period of time, with proper correlation with chemical conditions and feed at 36, a gradual reduction of the depth of the sludge bed will be possible and accordingly the scraper truss can then be lowered, in one or several steps as may be indicated by the conditions encountered.

A similar routine may be found desirable in the case that a deep sludge bed has been built up upon a nightly or weekly shutdown of the treatment process, and has not been removed from the tank by continuing the scraper rotation for some time after the stopping of inflow at 31. It is quite desirable to keep at least some amount of sludge on the bottom 12, at least for such length of time as may be found allowable in connection with possible septicity. The reason is that the new start of operations, required after such a shutdown, is greatly accelerated in the event that adequate amounts of sludge particles can be made available at once, instead of the gradual building up of a slurry from an extremely dilute to a properly concentrated condition as otherwise required.

Aside from the slurry treatment overloads explained above it is also possible, as in any other clarifier, that sudden temporary overloads may be encountered because leaves, branches or other debris may fall into the tank. This latter type of overload is serious only when encountered adjacent the outer ends of the scraper truss, where it causes a relatively large load moment. For this reason this latter kind of overload is frequently handled merely by mechanisms such as that of the Andrew patent initially mentioned. However, it will be obvious that this type of overload, as well as the more important overloads mentioned before, can be handled by means of the mechanism 78.

We claim:

1. In a slurry clarifier arrangement, a tank having a bottom and a peripheral wall upstanding therefrom, a sludge sump centrally located in the tank and extending below the bottom thereof, means to remove sludge from the sump, a supporting platform vertically above the sump and carried by the wall, a hollow vertical shaft extending downwardly through the platform, bearing means carried by the platform receiving said hollow shaft and accommodating rotational movement thereof and restricting vertical movement thereof, a drive gear fixedly secured to the hollow shaft below the bearing means, a vertically immovable slurry impeller fixedly mounted on the hollow shaft below the drive gear and approximately vertically centrally of the tank, an inlet communicating with the central portion of the tank below the impeller, a drive unit carried by the platform eccentrically of the hollow shaft and operatively connected to said gear to rapidly rotate said hollow shaft and impeller, a second shaft telescoped within said hollow shaft and extending above and below same, a rotatable sludge scraper secured to the lower end of the second shaft and positioned immediately above the bottom, power means having a connection to the upper end of said second shaft and supported by said platform, said connection comprising a bearing accommodating rotational movement of said second shaft and said scraper, said power means being operative to selectively and vertically raise and lower said second shaft and said scraper, a vertically immovable second gear supported by said platform intermediate said bearing means and said bearing, an axially elongated slot in said second shaft, a key interconnecting the slot and said second gear whereby rotational movement of said second gear will impart rotational movement to said second shaft and scraper, said key and slot being arranged to accommodate vertical movement of said second shaft while said second gear remains vertically stationary, a second drive unit carried by the platform eccentrically of the second shaft and operatively connected to the second gear to impart relatively slow rotational movement to the second shaft and scraper, and outlet means communicating with the tank.

2. In a slurry clarifier arrangement, the combination of a tank having a bottom and peripheral wall upstanding therefrom, a sludge sump centrally located in the tank, a supporting platform above the sump carried by the wall, a hollow shaft vertically arranged in the tank and having an impeller fixedly secured on the lower end thereof and in the tank, a second shaft telescoped within the hollow shaft and extending above and below the latter, bearing means supporting the hollow shaft from the platform so as to accommodate rotational movement thereof and restrict vertical movement thereof, other bearing means supporting second shaft from the platform and arranged to accommodate both vertical and rotational movement of the second shaft, a sludge scraper normally positioned adjacent the bottom of the tank and fixedly connected to the lower end of the second shaft, a first drive unit carried by the platform, means operatively connecting the first drive unit to the hollow shaft whereby said unit may impart a relatively rapid rotational movement to the hollow shaft and the impeller, a second drive unit carried by the platform, power transmission means operatively associating said second drive unit and said second shaft to impart relatively slow rotational movement to the second shaft and sludge scraper, said last mentioned transmission means including means to accommodate vertical movement of the second shaft while said last mentioned transmission means remains vertically stationary, and other power means arranged to selectively and alternately raise and lower said second shaft and said scraper.

3. Apparatus as claimed in claim 1 wherein said power means comprises hydraulic motor means adapted to be controlled from said scraper drive.

4. Apparatus as claimed in claim 1 wherein said power means comprises a vertical pressure cylinder above and in line with said shafts and pressure supply and release means adapted to raise and lower a piston in the cylinder to raise and lower the scraper shaft.

References Cited in the file of this patent

UNITED STATES PATENTS

| | | |
|---|---|---|
| 2,148,727 | Carroll | Feb. 28, 1939 |
| 2,419,004 | Bicker et al. | Apr. 15, 1947 |
| 2,425,372 | Green | Aug. 12, 1947 |
| 2,528,879 | Green | Nov. 7, 1950 |
| 2,589,298 | Scott | Mar. 18, 1952 |
| 2,633,453 | McAllister | Mar. 31, 1953 |
| 2,678,916 | Kalinske | May 18, 1954 |